United States Patent [19]
Vest

[11] 3,771,293
[45] Nov. 13, 1973

[54] LOUVER AIR CLEANER

[75] Inventor: Glenn E. Vest, Erie, Pa.

[73] Assignee: General Electric Company, Erie, Pa.

[22] Filed: Dec. 6, 1971

[21] Appl. No.: 204,906

[52] U.S. Cl............... 55/319, 55/437, 55/442, 98/3, 98/28, 105/59, 174/16, 317/100
[51] Int. Cl............................................. B01d 45/08
[58] Field of Search................. 55/267, 319, 437, 55/438, 442–444, 467, 470, 471–473; 174/16; 98/3, 28; 317/100; 105/59

[56] References Cited
UNITED STATES PATENTS
| | | | |
|---|---|---|---|
| 2,666,497 | 1/1954 | Welser | 98/3 |
| 3,355,864 | 12/1967 | Sobeck | 55/443 |
| 3,364,838 | 1/1968 | Bradley | 55/385 |
| 3,538,688 | 11/1970 | Stanley, Jr. et al. | 55/442 |

Primary Examiner—Bernard Nozick
Attorney—Walter C. Bernkopf

[57] ABSTRACT

An air cleaner system for use on diesel-electric locomotives requiring clean air for cooling electrical equipment, wherein contaminated atmospheric air is drawn into one end of an air duct, passed over louvered members located in the duct walls, and passed on to a filtering device which filters out the contamination and allows the cleaned air to circulate to the electrical equipment for the cooling thereof. Upon passing over the louvered members a portion of clean air is drawn therethrough by a low pressure area on their opposite sides, for use in cooling electrical equipment proximately located thereby, and the concentrated contaminated air is passed on for filtering and for cooling other electrical equipment.

7 Claims, 4 Drawing Figures 3,771,293

LOUVER AIR CLEANER

BACKGROUND OF THE INVENTION

This invention relates generally to air cleaners and more particularly to air cleaners of the louvered type for removing a portion of clean air from a stream of air having atmospheric dirt particles therein.

It is well-known that machines of many types, particularly electrical machines require the circulation of air over or through them to provide adequate ventilation. This is particularly true in the railway field with special emphasis on the supply of ventilating air to the electric driving motors. Due to their inherently small physical size and relatively large electrical rating, such motors, require a large volume of cooling air in order to prevent overheating during continued periods of operation.

It is also well-known that the air of the atmosphere contains varying amounts of dirt and dust. When it is necessary to pass air through the interior of a machine through ducts or other passages, the presence of dirt in the air often causes difficulties. Such dirt may be deposited in the air passages as the dirty air passes through them, resulting in the clogging of these passages and the restriction of the further flow of air through the passages, which in turn may cause overheating and subsequent failure of the machine. In addition, the deposit of dirt in the interior passages may result in an electrical failure by causing a short circuit. A further possible result of dirt deposits is the breaking loose of particles to render the machinery in an unbalanced condition, which in turn causes vibrations with subsequent failure. It is therefore especially important that such equipment be provided with suitable air circulating means, such as fans or blowers, in which provision is made for efficient removal of all, or substantially all, of the dirt and foreign matter from the cooling air before it is supplied to the electrical machinery.

In the locomotive industry it has been common practice to locate a blower substantially centrally with respect to the ends of the locomotive, and to cause the atmospheric air to flow in opposite directions therefrom. Panels of filters such as inertial filters or the like are inserted in transverse relationship to the air flow, between the blower and each group of drive motors located near either end. The contaminated air passes into these filters where it is cleaned with the dirt being discharged overboard and the cleaned air being passed on to the traction motors for cooling. In addition to the traction motors the alternator and rectifiers require ventilation, and a portion of the air is deflected upwardly to transverse filter panels to provide the cooling air thereto.

Locomotive design innovations require that the blower be placed at one end of the locomotive. With such a placement, the cooling air must transverse the length of the locomotive and the normal filtering scheme must be abandoned. Since the greatest part of the cooling air must travel forward to cool the alternator, rectifiers, and forward motors, it is necessary to extract a portion thereof to cool the after motors. The portion extracted must also be cleaned before being sent to the motors.

It is therefore an object of this invention to provide a new and improved system for the cleaning of cooling air for the electrical equipment on a traction vehicle.

Another object of this invention is the provision in a locomotive air cooling system for increased access room proximate the central portion thereof for the placement of auxiliary machinery therein.

Yet another object of this invention is the provision on a locomotive for locating the forced draft blower at one end thereof.

Still another object of this invention is the provision in a diesel-electric locomotive for an adequate supply of clean air to be provided to ventilate the electrical equipment aboard.

Yet another object of this invention is the provision on a locomotive for directing a portion of filtered air to cool, the alternator, rectifiers and a plurality of traction motors.

These objects and other features and advantages become more readily apparent upon reference to the following description when taken in conjunction with the appended drawings.

SUMMARY OF THE INVENTION

This invention utilizes a louver arrangement to extract and clean a portion of air for use in cooling the after motors of a locomotive while allowing the greatest portion of the intake air to traverse longitudinally along the locomotive for use in cooling the remaining electrical equipment.

A high velocity unidirectional atmospheric air flow is introduced into one end of a locomotive by a forced draft blower. Located near the blower substantially contiguous with the side walls of the train are a plurality of louvers which act to skim off from the contaminated atmospheric air a portion of clean air which is directed to cool electrical drive motors. The remainder of the contaminated air continues to flow longitudinally along the locomotive, where it is subsequently filtered and the filtered air directed to cool electrical traction motors in the other end of the locomotive.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
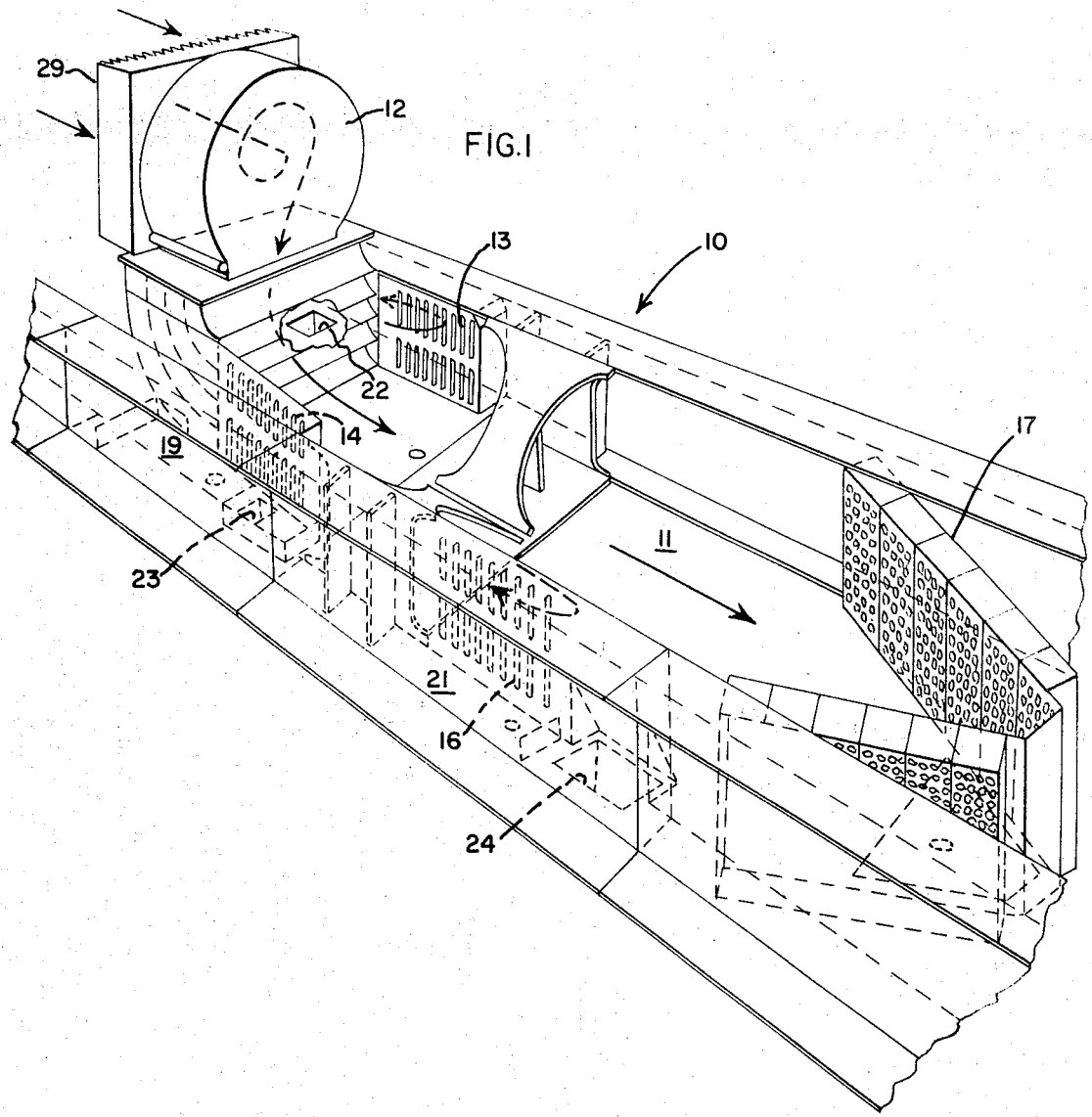
FIG. 1 is a perspective view of the louver air cleaner of the preferred embodiment.

Referring now to FIG. 1 the louvered air cleaner is indicated generally at 10 and comprises in combination with a locomotive platform air duct 11, a forced draft blower 12, a number of louver members 13, 14 and 16 and a filter assembly 17. Adjacent the longitudinal walls of the air duct 11 on the inner side thereof are a number of compartments 18, 19 and 21, which communicate with the air duct 11 through the louver members and which also communicate through their associated vents, 22, 23 and 24 respectively with traction motors 26, 27 and 28 respectively, (FIG. 2) of the electrical type commonly used on diesel-electric locomotives.

The atmospheric air enters inlet 29 and is forced into the duct by the blower 12 where it travels longitudinally along the duct. A portion of air passes through the louver members to cool the motors 26, 27 and 28, that portion being cleaned as it passes through the louver members. The remaining air passes to the filter assembly 17 to be cleaned for use in cooling additional electrical equipment.

The blower is of the conventional centrifugal type and is located at one end, and preferably the forward end of a traction vehicle, such as a locomotive above the platform air duct 11. A deflector 31 curving downwardly and rearwardly fluidly connects the blower to the forward end of the air duct 11, the deflector having a plurality of vanes 32 internally aligned along its length to promote a smooth flow of air therethrough.

Figure 4:
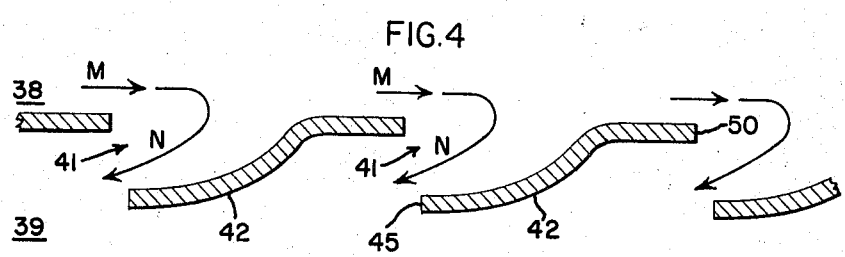
FIG. 4 is a cross-sectional view of a louver member of the preferred embodiment.
Figure 2:
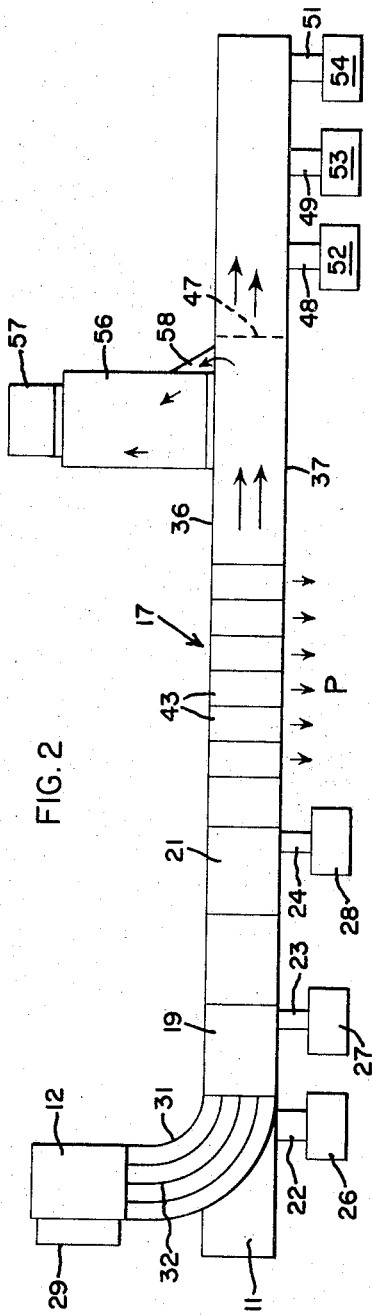
FIG. 2 is a schematic side plan view of the platform air duct and associated equipment on a locomotive.
Figure 3:
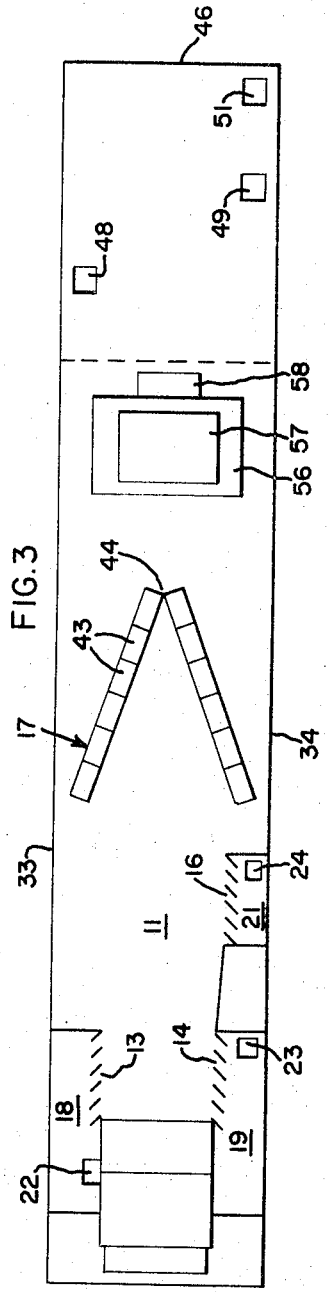
FIG. 3 is a top plan view thereof.

The air duct 11 comprises an elongate conduit having opposing side walls 33 and 34, an upper wall 36, and a lower wall 37. (FIGS. 2 and 3). Located adjacent the side walls on the inner side thereof are the rectangular compartments 18, 19 and 21, having as their inner walls the louvered members 13, 14, and 16, respectively. The louver members have a cross-sectional profile as shown in FIG. 4 with the air flow thereover being as indicated. The louver members comprise alternately placed vertical apertures 41 and fins 42. The fins each have a leading edge 45 and a trailing edge 50 and are so formed as to curve outwardly from the main stream of contaminated air, wherein the leading edges are disposed outwardly from the trailing edges. On the inner side 38 of the louver member is a high pressure area caused by the blower 12, whereas on the outer side 39, which is in a compartment a lower pressure condition exists. The contaminated air flow indicated by arrows M flows past the apertures 41 and fins 42 in the direction indicated. Due to the pressure drop across the apertures a portion of the air, N tends to flow therethrough along the path of the arrows. Any dirt particles that may be contained in the contaminated air have a greater mass and consequent greater momentum than the air. Thus the pressure differential is not sufficient to change the direction of flow of these particles and they continue to flow in the mainstream of contaminated air. In contrast, the air is deflected from their flow path by the pressure differential, and a portion thereof flows to the associated compartment along the path of the arrows N. This cleaned air then passes through the vents to provide ventilation for the traction motors.

The size of the apertures 41 employed in the louver members is dependent on the approach velocity of the mainstream of contaminated air, as well as the amount of cooling air required by the motors for proper ventilation. Experience has shown that an amount of approximately 30 percent of the mainstream when skimmed off provides sufficient ventilation for the traction motors while the remaining air after cleaning is sufficient to cool the remaining equipment. Higher approach velocity and hence greater efficiency of the louver members is attained by the use of a unidirectional air flow from the blower. Consequently, some efficiency may be sacrificed by allowing larger apertures which reduce the tendency of the louver apertures to plug with dirt.

Located substnatially amidships is the filter assembly 17 comprising a plurality of filter elements 43, integrally secured to form a U-shape having its apex 44 toward the rear. Contained in each of the elements 43 is a multiplicity of filters, such as the standard inertial filter type, wherein the dirt particles along with a small amount of bleed-off air is discharged outside the system in a direction indicated by the arrows P in FIG. 2. The remaining air is in a cleaned condition and continues to flow rearwardly in the duct 11.

At a point in the duct intermediate the filter assembly 17 and the rear end 46 is a baffle member 47 extending transversely across the duct. It contains a multiplicity of holes therein which allow a portion of the air to continue rearwardly where it enters the downwardly extending vents 48, 49, and 51 to provide ventilation for the traction motors 52, 53 and 54 respectively.

The baffle member 47 provides sufficient restriction to the air flow so as to maintain a pressure forward thereof. Located above the duct is the main traction alternator 56 and the associated rectifiers 57 which also require a certain amount of ventilation. An air passage 58 is provided which fluidly connects the air duct at a point forward of the baffle member 47 to the alternator where the air circulates as shown by the arrows.

I claim:

1. An improved air cleaner system of the type having an elongate duct into which contaminated air is forced and filtered for delivery to vents at opposite ends thereof, wherein the improvement comprises:
    a. an elongate non-converging duct having side walls and opposing entrance and exit ends;
    b. a first vent connected to said duct near said entrance end;
    c. a second vent connected to and fluidly communicating with said duct near said exit end;
    d. blower means attached to said duct entrance end for forcing an initial volume of contaminated air longitudinally into said duct;
    e. louver means in said duct in substantial alignment with and adjacent said duct side walls, such that when said initial volume of air passes, a clean portion thereof is skimmed off and the remaining principal, dirt concentrated, portion of contaminated air continues to flow longitudinally along said duct;
    f. means for conducting said clean portion to said first vent; and
    g. a filter disposed across said duct intermediate said louver means and said second vent, such that said dirt concentrated portion of air is received and filtered thereby, and the resulting filtered air is allowed to continue its longitudinal flow to said second vent.

2. An air cleaner system as set forth in claim 1 wherein the amount of said clean portion of air going to said first duct is substantially equal to the amount of said filtered portion of air going to said second vent.

3. An air cleaner system as set forth in claim 1 wherein said louver means is disposed adjacent at least one of said side walls and includes end walls integrally secured thereto and extending between said louver means and said side wall to form a compartment which fluidly communicated with said first vent.

4. An air cleaner as set forth in claim 1 wherein said louver means comprises a series of alternate vertical fins and apertures, said fins having a leading edge disposed upstream and outboard of its trailing edge with respect to the stream of contaminated air.

5. An air cleaner system as set forth in claim 1 wherein said louver means is so constructed that the amount of said clean portion of air skimmed off comprises approximately 30 percent of said initial volume of concentrated air.

6. An air cleaner system as set forth in claim 1 wherein said filter includes a contaminant discharge port for discharging dirt particles along with a portion of bleed off air.

7. An air cleaner system as set forth in claim 1 and including an air passage fluidly connected to said duct at a point intermediate said filter and said second vent, said air passage being so constructed as to divert a portion of filtered air from said duct.

* * * * *